US010227093B2

(12) United States Patent
Stoddart et al.

(10) Patent No.: US 10,227,093 B2
(45) Date of Patent: Mar. 12, 2019

(54) SUB-FRAME METHOD AND ARRANGEMENT FOR RELEASING A FRONT SECTION OF THE SUBFRAME

(71) Applicant: Ningbo Geely Automobile Research & Development Co., Ltd., Ningbo (CN)

(72) Inventors: Tom Stoddart, Mölndal (SE); Dan Adamsson, Sävedalen (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 0 days.

(21) Appl. No.: 15/783,473

(22) Filed: Oct. 13, 2017

(65) Prior Publication Data

US 2018/0057072 A1 Mar. 1, 2018

Related U.S. Application Data

(63) Continuation of application No. PCT/SE2016/050444, filed on May 17, 2016.

(30) Foreign Application Priority Data

May 19, 2015 (SE) .................................... 1550634

(51) Int. Cl.
*B62D 27/06* (2006.01)
*B62D 21/15* (2006.01)
*B62D 21/11* (2006.01)

(52) U.S. Cl.
CPC ............ *B62D 27/065* (2013.01); *B62D 21/11* (2013.01); *B62D 21/155* (2013.01); *B60G 2206/016* (2013.01); *B60G 2206/60* (2013.01)

(58) Field of Classification Search
CPC .... B62D 25/2018; B62D 21/02; B62D 21/11; B62D 25/082; B62D 25/2027; B62D 25/2045; B62D 29/041

(Continued)

(56) References Cited

U.S. PATENT DOCUMENTS 7,380,829 B2* 6/2008 Kishima .............. B62D 21/155
                                                    180/232
8,490,988 B2* 7/2013 Takeshita ............. B62D 21/155
                                                    280/124.109

(Continued)

FOREIGN PATENT DOCUMENTS

DE         4125674 A1    2/1993
DE    102014202958 A1    9/2014

(Continued)

OTHER PUBLICATIONS

Notification of Transmittal of the International Preliminary Report on Patentability of PCT/SE2016/050444 dated Feb. 5, 2017, 15 pages.

(Continued)

*Primary Examiner* — D Glenn Dayoan
*Assistant Examiner* — Sunsurraye Westbrook
(74) *Attorney, Agent, or Firm* — Lee & Hayes, PLLC

(57) ABSTRACT

A sub-frame and method in a sub-frame arrangement in a vehicle wherein said sub-frame arrangement comprises a sub-frame, a body member, and a first and second attachment socket. Each attachment socket is adapted to host a fastening means arranged in a through going apertures of each attachment socket and adapted to fasten said sub-frame to the body member. The fastening means are adapted to fasten a front section of said sub-frame, first and second attachment sockets each comprises a weakened portion arranged at an angle separated from the vehicle deformation direction during a front collision, and the weakened portions are adapted to give way releasing the sub-frame in the event of deformation of the vehicle.

19 Claims, 10 Drawing Sheets

(58) Field of Classification Search
USPC .... 296/187.08, 193.07, 187.12, 204, 187.07,
296/70, 63.13, 64; 89/36.08, 36.09, 930,
89/903, 918, 929; 280/124.109, 784, 777,
280/783, 788; 180/68.5, 274, 312, 68.6
See application file for complete search history.

(56) References Cited

U.S. PATENT DOCUMENTS

| | | | | |
|---|---|---|---|---|
| 8,794,646 | B1* | 8/2014 | Onishi | B62D 21/155 |
| | | | | 280/124.109 |
| 2011/0095568 | A1* | 4/2011 | Terada | B62D 21/11 |
| | | | | 296/187.09 |
| 2011/0198889 | A1 | 8/2011 | Takeshita et al. | |
| 2011/0316295 | A1* | 12/2011 | Yamada | B62D 21/11 |
| | | | | 293/132 |

FOREIGN PATENT DOCUMENTS

| | | |
|---|---|---|
| EP | 2851270 A1 | 3/2015 |
| JP | 2002002528 A | 1/2002 |
| JP | 2004148960 A | 5/2004 |
| WO | WO2014167902 A1 | 10/2014 |

OTHER PUBLICATIONS

International Search Report and Written Opinion of PCT/SE2016/050444 dated Aug. 29, 2016, 15 pages.
Swedish Office Action dated Nov. 19, 2015 for Swedish patent application No. 1550634-8, a counterpart foreign application of U.S. Appl. No. 15/783,473, 6 pages.

* cited by examiner

SUB-FRAME METHOD AND ARRANGEMENT FOR RELEASING A FRONT SECTION OF THE SUBFRAME

RELATED APPLICATIONS

This application is a continuation of PCT International Application No. PCT/SE2016/050444, filed May 17, 2016, which claims foreign priority to Sweden Application No. 1550634-8, filed on May 19, 2015, both of which are incorporated herein by reference.

TECHNICAL FIELD

The present invention relates generally to a sub-frame arrangement for attaching the front section of a sub-frame in the sub-frame arrangement.

BACKGROUND ART

In prior art it is known to produce sub-frame arrangements comprising means for releasing a sub-frame in order to direct the sub-frame arrangement underneath a passenger cell of a vehicle. There are multiple different solutions available in prior art describing methods and devices for detaching a sub-frame, such as pyrotechnical and mechanical solutions. The sub-frame arrangements of prior art are generally adapted to cope with front collisions and releasing the sub-frame with a purpose of prolonging the deformation distance without the risk of pressing the engine and powertrain into the passenger compartment. However, while prolonging the deformation distance is beneficial during normal front collisions such solutions reduces the amount of force that a vehicle structure/body/chassis absorb during small offset collisions and especially moderate overlap collisions.

Another problem with the prior art solutions is that the mechanical solutions are generally adapted to release the sub-frame during front collisions, i.e. when the vehicle is deforming in an inverted travel direction of the vehicle. This has the effect that such sub-frame arrangements are weakened in a direction that is subjected to forces during normal driving conditions.

It would thereby be beneficial to provide a solution that addresses at least some of the problems of the prior art.

SUMMARY OF INVENTION

An object of the present invention is to create a sub-frame arrangement allowing for controlled release of at least part of a sub-frame without making the sub-frame arrangement weak in any direction subjected to substantial forces during normal driving conditions. Another object of the present solution is to provide a sub-frame arrangement that handles a combination of releasing the sub-frame with control and absorbing force effectively from front collisions, moderate overlap collisions, and small offset collisions.

Thus the invention relates to a sub-frame arrangement in a vehicle wherein said sub-frame arrangement comprises a sub-frame, a body member, and a first and second attachment socket. Each attachment socket is adapted to host a fastening means arranged in a through going apertures of each attachment socket and adapted to fasten said sub-frame to the body member, wherein
said fastening means are adapted to fasten a front section of said sub-frame,
said first and second attachment sockets each comprises a weakened portion arranged at an angle separated from the travel direction of the vehicle, and
the weakened portions are adapted to give way releasing the sub-frame in the event of deformation of the vehicle,
wherein at least one of the weakened portions is arranged at an angle substantially perpendicular to the travel direction of the vehicle when viewed from above such that the at least one weakened portion is adapted to release the sub-frame when the body members deform in an outwards direction substantially perpendicular to the travel direction of the vehicle during a collision.

It is one advantage with the present solution that the weakened portion of sub-frame is separated from the vehicle deformation direction. The vehicle deformation direction is during any form of front collision directly related to the travel direction of said vehicle. This has the effect that a weakening arranged in the deformation direction also weakens the structure in relation to forces that it is subjected to during normal driving conditions. Through arranging the weakness at another angle this is avoided.

There are different solutions for solving the problem of deformation direction in relation to travel direction of the vehicle. Through arranging the body members in a way that they deform outwards in the attachment area to the sub-frame it is possible to place the weakened portions at an angle substantially different from the travel direction of the vehicle. Thereby, in one embodiment of the solution are the body members arranged to deform outwards from the engine compartment.

It is another advantage of the present solution that an attachment socket is used at each side of the sub-frame arrangement in order to attach the sub-frame to the vehicle body. The attachment sockets allows for a solution wherein the attachment means in one embodiment are left in the body while the socket deforms. i.e. through the attachment socket opening up at the weakened portion.

According to one embodiment of the sub-frame arrangement, the weakened portion of said first attachment socket is arranged at a different angle than the weakened portion of said second attachment socket.

It is another advantage with the present solution that the attachment sockets of each side of the sub-frame arrangement, i.e. the first and second attachment sockets, in one embodiment have different angles for the weakened portion in relation to the travel direction of the vehicle. This distributes the forces exerted during normal driving conditions and generates a rigid sub-frame arrangement.

It is yet another advantage with the present solution that through utilizing different angles between a travel direction of the vehicle and the weakened portions it is possible to create body members that are not symmetrical between the left and right side of the vehicle. This is beneficial for example when arranging a transverse engine or a transverse engine with a gearbox in the engine compartment between said body members.

According to one embodiment of the sub-frame arrangement the sub-frame further comprises two towers.

According to one embodiment of the sub-frame arrangement, said sub-frame is a dual part sub-frame comprising a lower sheet section and a top section, the two towers are arranged as part of said top section.

It is one advantage with the present solution that the sub-frame is a dual part sub-frame enabling lower production costs.

According to one embodiment of the sub-frame arrangement are said weakened portions elongated weakened portions, preferably slits.

According to one embodiment of the sub-frame arrangement said weakened portions are elongated weakened portions, preferably slits, extending in the longitudinal direction of each attachment socket.

The person skilled in the art understands that the weakened portions may be any form of weakened portion, not limited to apertures, slits, and partial material reductions.

According to one embodiment of the sub-frame arrangement are said attachment sockets adapted to give way upon impact from another object of the front suspension during deformation.

In one embodiment are the weakened portions of said attachment sockets arranged to give way upon impact from another object of the front suspensions or any other object located in front of the sub-frame arrangement. For example, in one embodiment is a front drive shaft of the vehicle forced backwards from deformation of the vehicle. The front drive shaft hits the attachment socket, or the sub-frame anywhere in the close vicinity of the attachment socket, and thereby deforms the attachment socket allowing the front section of the sub-frame to be released.

In another embodiment is the sub-frame front section released through a combination of body member deformation and impact from another object.

According to one embodiment of the sub-frame arrangement, said weakened portion of the first attachment socket is arranged at a first angle of 58 degrees anti-clockwise seen from the front of the first attachment socket viewed from above and the weakened portion of the second attachment socket is arranged at an angle of 38 degrees anti-clockwise seen from the front of the second attachment socket viewed from above.

It is one advantage of the present solution that the weakened portions in one embodiment are arranged at different angles which both are substantially separated from the travel direction and the inverted travel direction of the vehicle. The person skilled in the art understands that the inverted travel direction is a direction of 180° offset from the travel direction.

According to one embodiment of the sub-frame arrangement said weakened portion of the first attachment socket is arranged at a first angle anticlockwise seen from the front of the first attachment socket viewed from above. The weakened portion of the second attachment socket is arranged at an angle seen from the front of the second attachment socket viewed from above. The first and second angles are determined based on tuning properties for said sub-frame arrangement.

The first and second angles in the sub-frame arrangement are in one embodiment tailored angles for the specific vehicle. The angles are determined based on tuning and balancing features for the vehicle body and chassis during deformation. For example, in one embodiment are the first and second angle determined based on at which force the sub-frame shall be released. The person skilled in the art understands that tuning options are dependent of vehicle characteristics such as the vehicle weight.

According to one embodiment of the sub-frame arrangement the weakened portion is arranged in a direction only subjected to limited forces during normal driving conditions.

It is one advantage with the present solutions that the weakened portions are arranged at an angle allowing for the weakened portions of the sockets to be subjected to a minimal force during normal driving conditions. Normal driving conditions means conditions that a vehicle is subjected to during its normal driving and excluding conditions occurring during collisions and crashes.

It is further one advantage that the weakened portions are in a direction substantially only subjected to force during collisions when the body members deforms outwards.

According to one embodiment of the sub-frame attachment arrangement the attachment means is adapted to be retained in the body member when the engagement to the sub-frame is released during deformation.

According to one embodiment of the sub-frame arrangement the sub-frame arrangement further comprises rear attachment means and main bolts, wherein said attachment means are adapted to release prior of releasing the main bolts during deformation, and wherein the rear attachment means are adapted to maintain engagement with the sub-frame and the vehicle body during the entire deformation.

The main bolts are in one embodiment adapted to retain the sub-frame during normal driving conditions.

According to one aspect of the present invention, there is provided a method for releasing a sub-frame arrangement in a vehicle during deformation of said vehicle, said sub-frame arrangement comprising a sub-frame, a body member, and an attachment socket adapted to host a fastening means. The fastening means are adapted to be arranged in a through going aperture of said attachment socket and adapted to fasten said sub-frame to the body member. The attachment sockets each comprises a weakened portion arranged at an angle separated from the travel direction of the vehicle, and in that following steps are performed:

retaining a front section of said sub-frame to the body member through said fastening means, release said sub-frame through deformation of the weakened portions of said attachment sockets during deformation of the vehicle, and the weakened portion gives way when the body member deforms outwards in a direction substantially perpendicular to the travel direction of the vehicle.

According to one embodiment the weakened portion is an elongated weakened portion, preferably a slit.

According to one embodiment of the sub-frame arrangement in a vehicle wherein said sub-frame arrangement comprises a sub-frame, a body member, and a first and second attachment socket, each attachment socket is adapted to host a fastening means adapted to fasten said sub-frame to the body member, wherein said fastening means are adapted to fasten a front section of said sub-frame, said first and second attachment sockets each comprises a weakened portion arranged at an angle separated from the travel direction of the vehicle, and the weakened portions are adapted to give way releasing the sub-frame in the event of deformation of the vehicle.

According to one embodiment of the sub-frame arrangement said fastening means are arranged in a through going aperture of each attachment socket.

BRIEF DESCRIPTION OF DRAWINGS

The invention is now described, by way of example, with reference to the accompanying drawings, in which.

DESCRIPTION OF EMBODIMENTS

In the following, a detailed description of different embodiments of the sub-frame arrangement is disclosed under reference to the accompanying drawings. All examples herein should be seen as part of the general description and are therefore possible to combine in any way of general terms. Individual features of the various embodiments and aspects may be combined or exchanged unless such combination or exchange is clearly contradictory to the overall function of the disclosed arrangement.

Briefly the invention relates to a sub-frame arrangement for fastening the front section of a sub-frame to a vehicle, especially to fasten said sub-frame to body members in a way that the function of releasing the sub-frame during a collision is created without weakening the sub-frame arrangement in relation to forces excreted during normal driving conditions.

Figure 1:
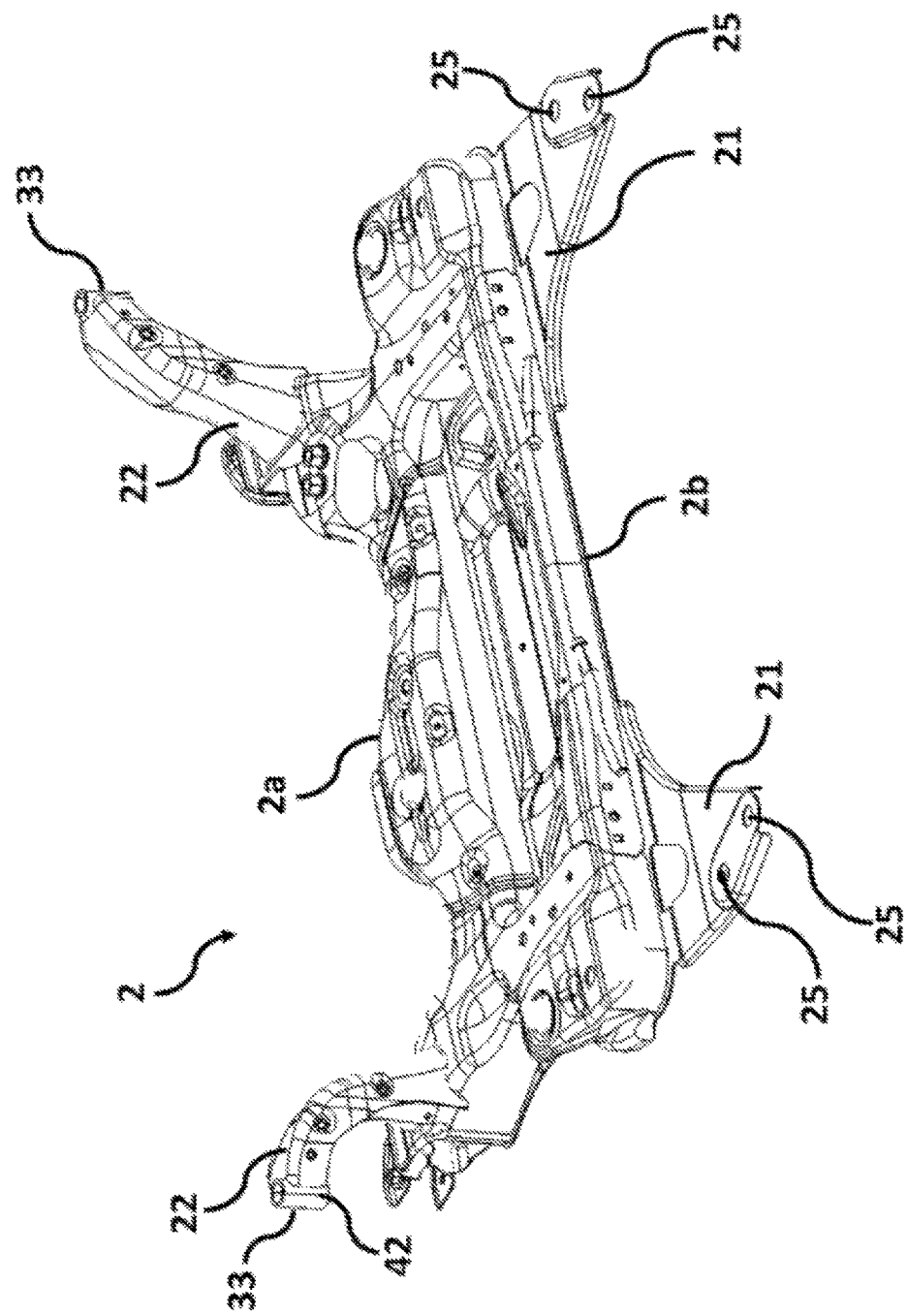
FIG. 1 illustrates one embodiment of the sub-frame shown in an isometric view.

FIG. 1 illustrates an isometric view of the sub-frame 2 adapted to be arranged in a sub-frame arrangement 1. The sub-frame 2 comprises a lower sheet section 2b and a top section 2a. The top section comprises two towers 22 which hosts the attachment sockets 33. The attachment socket comprises the weakened portion 42. The attachment socket 33 comprising a weakened portion 42 is in one embodiment adapted to deform in a way that the weakened portion 42 gives way opening up the attachment socket 33 allowing for the attachment means 4b to be released from the attachment socket 33.

FIG. 1 further illustrates two rear portions 21 of the lower sheet sections that are adapted to host the rear fastening means 4a.

Figure 2:
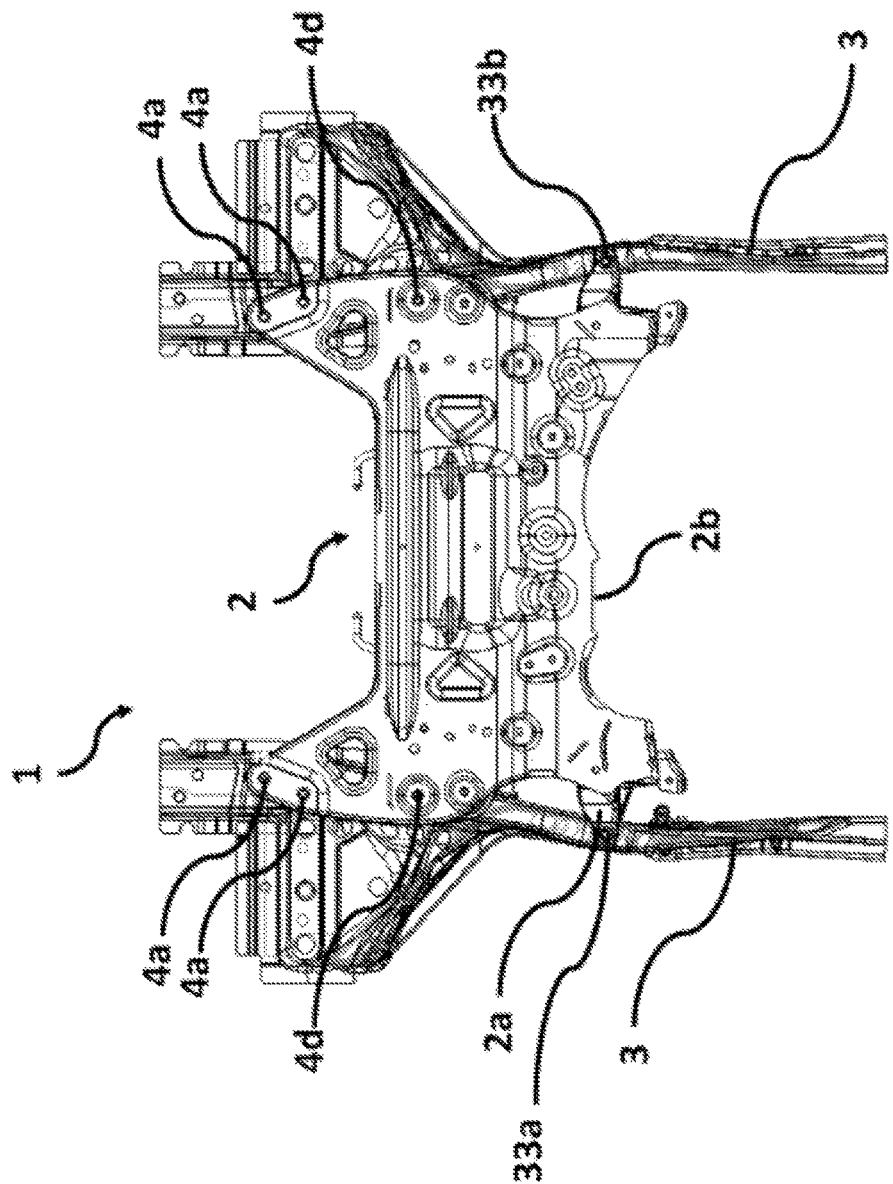
FIG. 2 illustrates one embodiment of the sub-frame arrangement seen from below.

FIG. 2 illustrates an embodiment of the sub-frame arrangement 1 viewed from below wherein the lower sheet section 2b is clearly visible. FIG. 2 further illustrates one embodiment wherein the first attachment socket 33a and the second attachment socket 33b are indicated. The attachment sockets 33a, 33b are adapted to fasten the sub-frame 2 through means of attachment means 4b to the body members 3.

Figure 3:
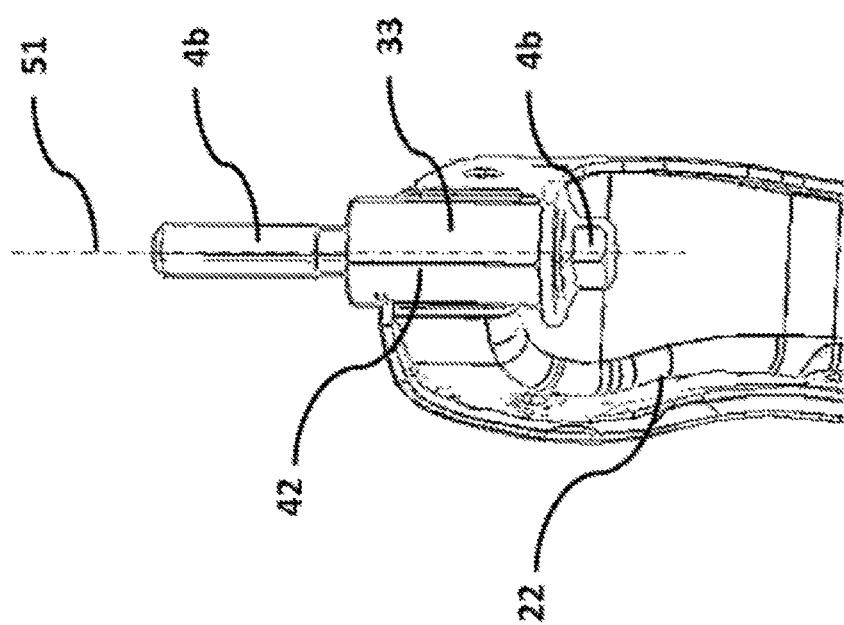
FIG. 3 illustrates one embodiment of the attachment socket, the weakened portion, the attachment means, and how it is arranged in relation to a tower of the sub-frame.

FIG. 3 illustrates one embodiment of a tower 22 wherein the attachment socket 33 is arranged substantially on the top of the tower 22 and wherein the weakened portion 42 is illustrated. FIG. 3 further illustrates an attachment means 4b which is arranged through going through the attachment socket 33 along a center axis 51.

Figure 4:
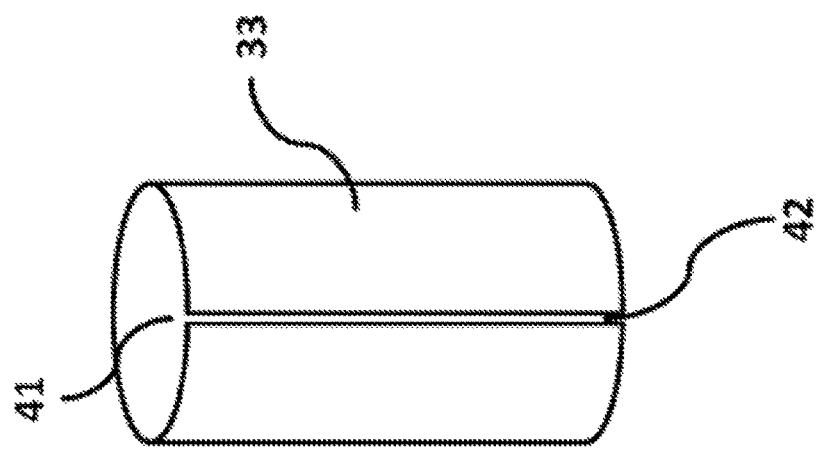
FIG. 4 illustrates one embodiment of the attachment socket.

FIG. 4 illustrates one embodiment of the attachment socket 33 wherein the weakened portion 42 is illustrated as a slit 42 arranged parallel to the center axis 51 of the attachment socket 33. The person skilled in the art understands that the weakened portion 42 may have any angle, shape, or form serving the purpose of the solution as disclosed herein. FIG. 4 further illustrates that the attachment socket 33 comprises a through going aperture 41 passing through the attachment socket 33 and adapted to host attachment means 4b.

Figure 5:
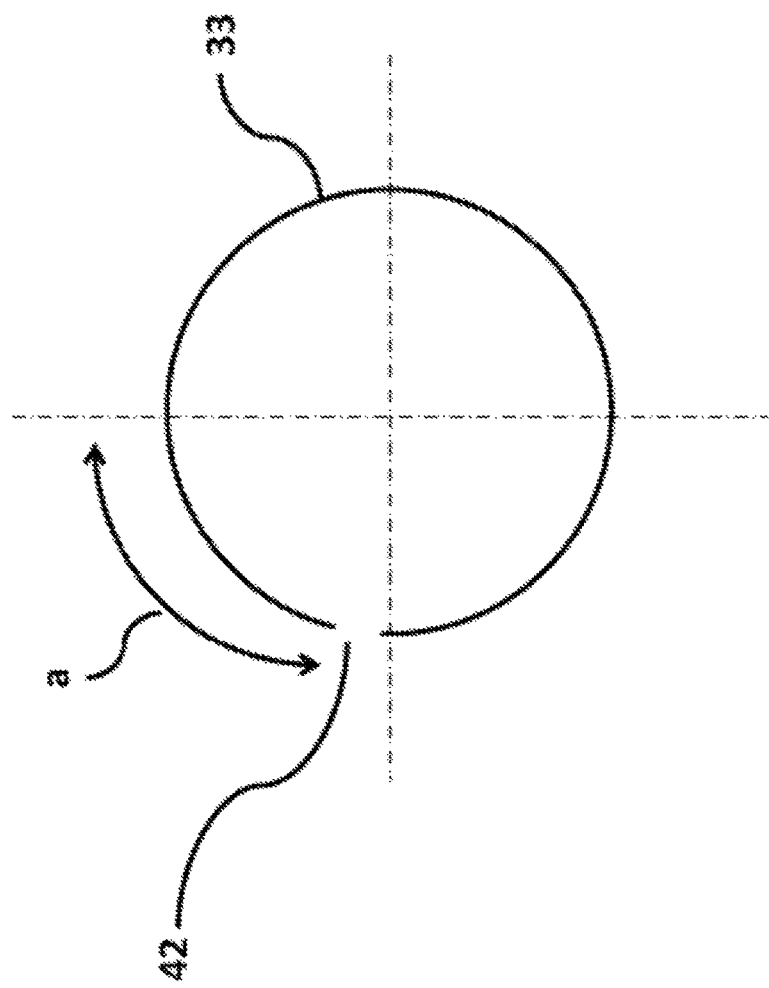
FIG. 5 illustrates one embodiment of the attachment socket from a top view.

FIG. 5 illustrates one embodiment of the attachment socket 33 wherein the weakened portion 42 is arranged at an angle a from the travel direction of the vehicle. It should be noted that the angle a can be any angle substantially separated from 0° and 180°, i.e. the travel direction and inverted travel direction of the vehicle and moreover also mentioned as the deformation direction and inverted deformation direction.

Figure 6:
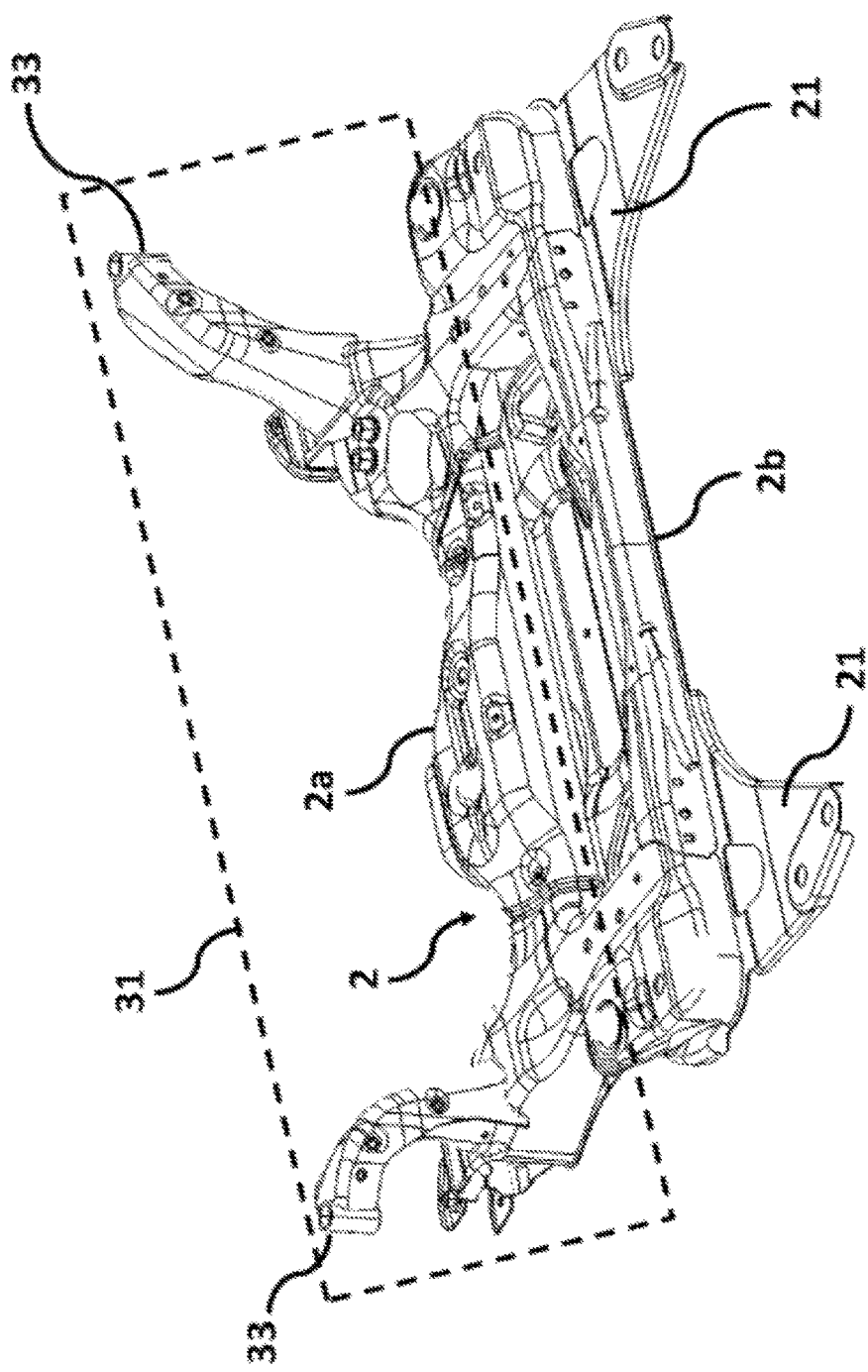
FIG. 6 illustrates one embodiment of the sub-frame of the sub-frame arrangement indicating the front section of the sub-frame.

FIG. 6 illustrate one embodiment of the sub-frame 2 with a top section 2a and a lower sheet section 2b. The lower sheet section comprises two rear portions 21 that are adapted to host rear fastening means 4a. The rear fastening means are adapted to retain the sub-frame 2 in engagement with the body of the vehicle both during normal driving conditions and when a crash occurs. FIG. 6 further illustrates the front section 31 of the sub-frame 2. The sub-frame arrangement 1 of the present solution is as previously stated adapted to release the front section 31 of the sub-frame while retaining the rear attachment in engagement with the body. Through releasing the front section 31 of the sub-frame 2 while maintaining engagement of the rear section controlled deformation is enabled while the deformation distance and absorption capabilities can be enhanced for small offset collisions, moderate overlap collisions, and front collisions.

FIG. 6 further illustrates that the front section 31 of the sub-frame 2 comprising both sections of the top section 2a and the lower sheet section 2a. However, the rear portions 21 are not part of the front section 31.

Figure 7:
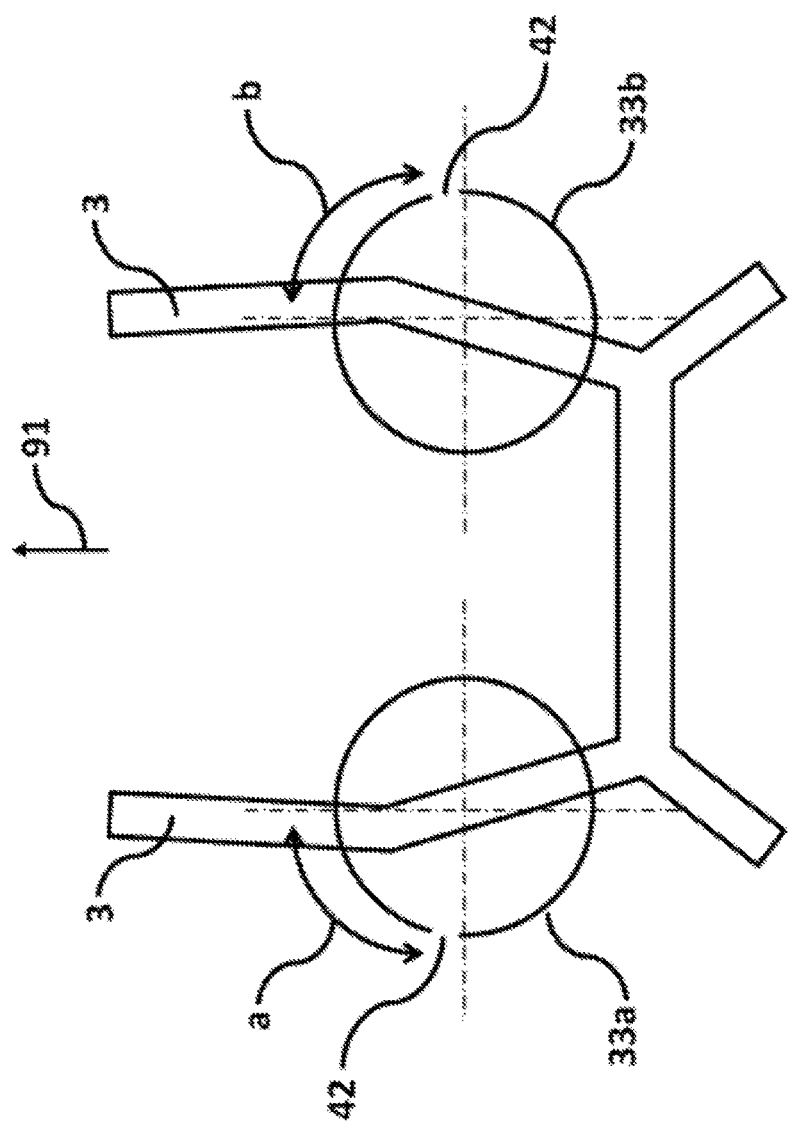
FIG. 7 illustrates one illustrative embodiment of the sub-frame arrangement showing a sketch explaining the attachment sockets and the angles of the weakened portions.

FIG. 7 shows one illustrative embodiment of the attachment sockets in relation to the body members 3 of a vehicle. In one embodiment of the sub-frame arrangement 1 are the angles a, b for the first and second attachment sockets 33a, 33b the same. In another embodiment are the angles a, b different. The angles a, b are the angles between a travel direction 91 of the vehicle and the weakened portions 42. FIG. 7 further illustrates one embodiment where both the angles a, b are substantially perpendicular. The attachment sockets are thereby arranged with the weakened portions 42 at angles a, b substantially perpendicular to the travel direction of the vehicle when viewed from above. I.e. when the attachment sockets are viewed from above as illustrated in FIG. 7 the weakened portions 42 are arranged at angles a, b substantially perpendicular to the travel direction in the horizontal plane.

Figure 8:
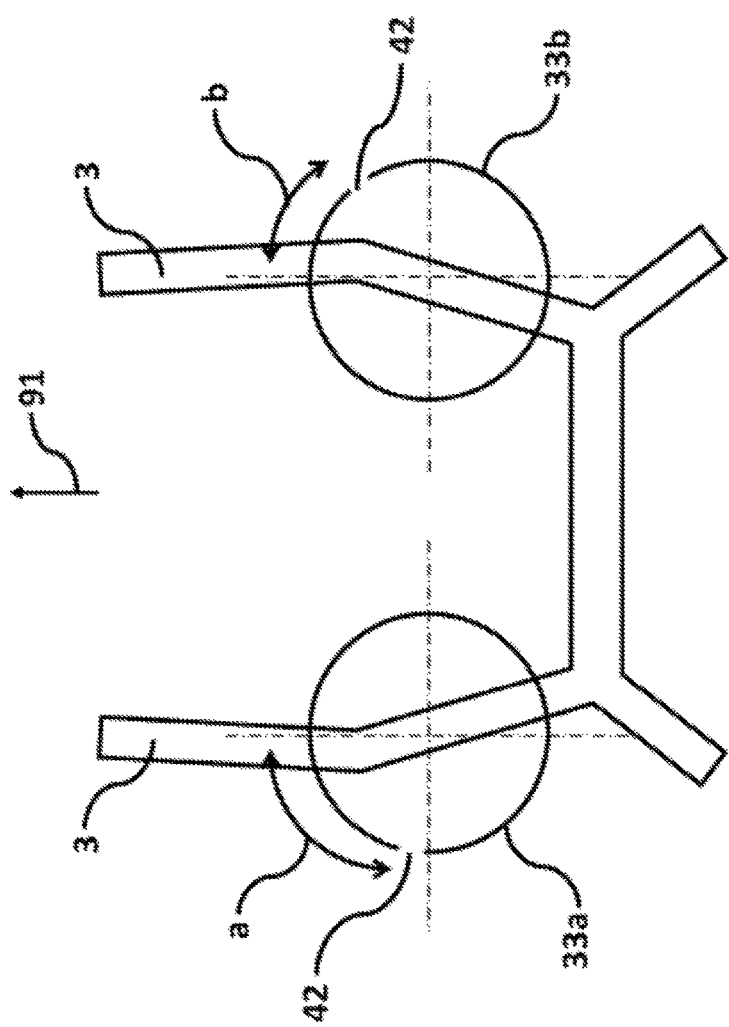
FIG. 8 illustrates another illustrative embodiment of the sub-frame arrangement showing a sketch explaining the attachment sockets and the different angles of the weakened portions.

FIG. 8 shows another illustrative embodiment of the attachment sockets 33a, 33b wherein the angles a, b are different. Through arranging different angles a, b between the travel direction 91 and the weakened portions 42 it is possible to distribute the load during normal driving condition. FIG. 8 thereby illustrates how at least one of the weakened portions 42 in one embodiment is arranged at an angle a substantially perpendicular to the travel direction in the horizontal plane. I.e. when the attachment sockets are viewed from above as illustrated in FIG. 8 at least one of the weakened portions 42 is arranged at an angle a substantially perpendicular to the travel direction of the vehicle.

Figure 9:
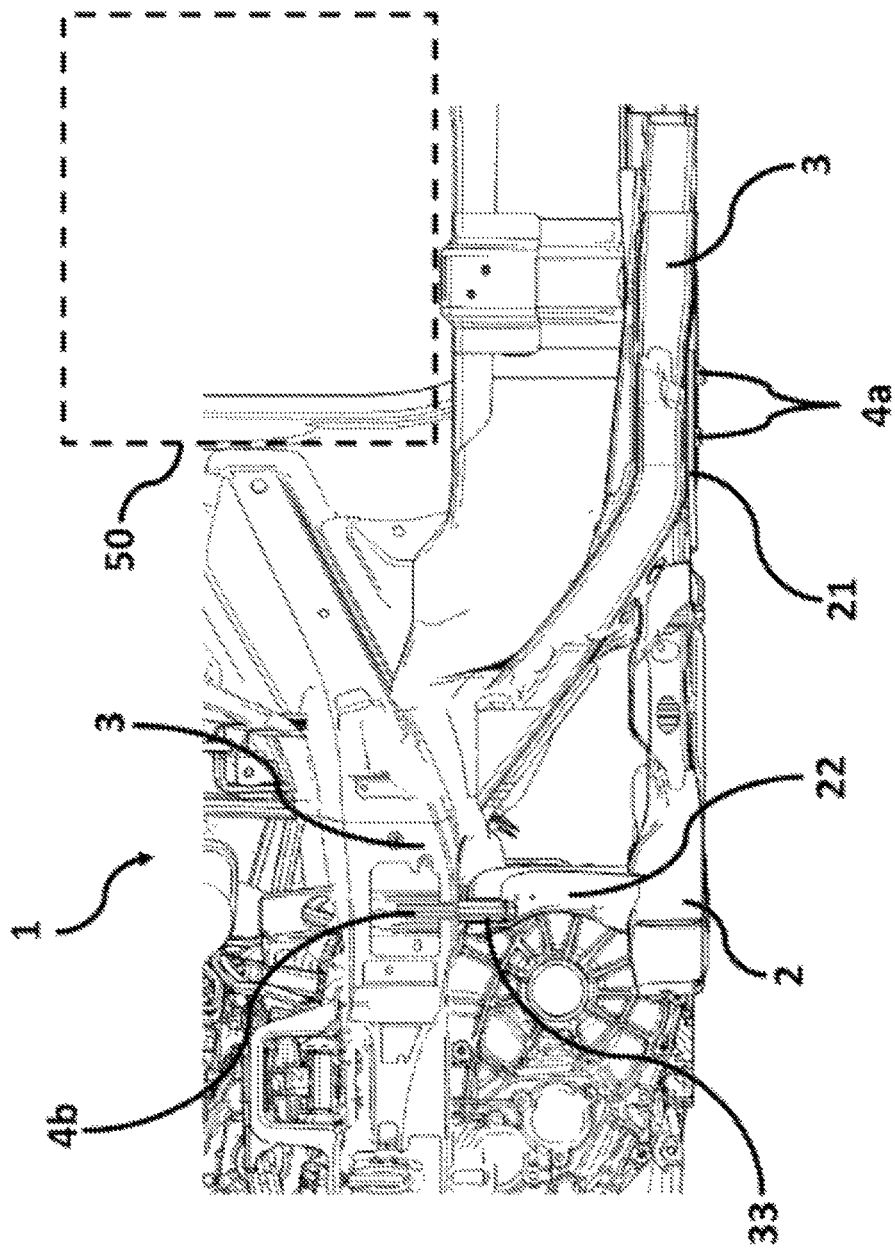
FIG. 9 illustrates one embodiment of the sub-frame arrangement wherein the sub-frame is arranged within a vehicle.

FIG. 9 illustrates one embodiment of the sub-frame arrangement 1 arranged within a vehicle. The sub-frame 2 is attached to the body of the vehicle through means of attachment means 4a, 4b which passes through apertures in the sub-frame 2 and attaches said sub-frame 2 to the body members 3. The sub-frame comprises the attachment sockets 33 that are arranged to fasten a front section 31 of the sub-frame 2.

Figure 10:
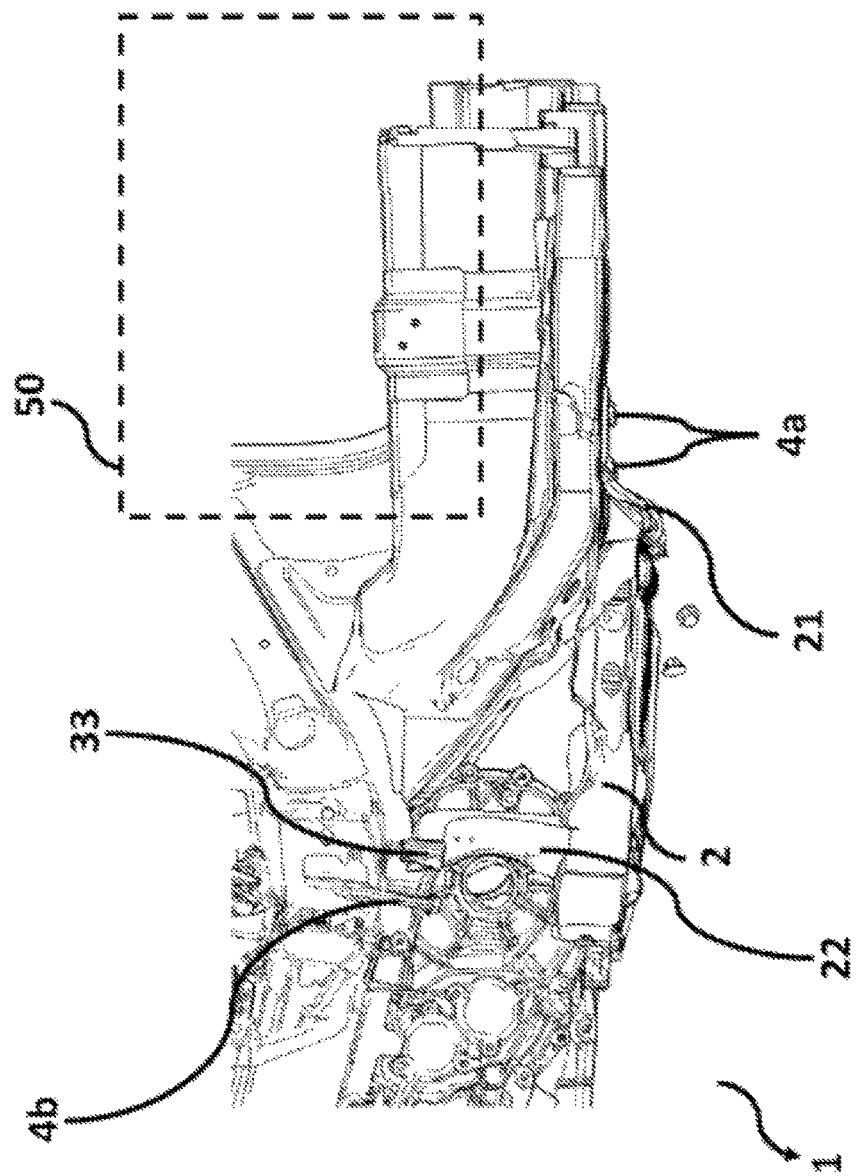
FIG. 10 illustrates one embodiment of the sub-frame arrangement wherein the sub-frame is arranged within a vehicle and a collision has occurred.

FIG. 10 illustrates one embodiment of the sub-frame arrangement 1 after a collision has occurred wherein deformation has caused the sub-frame 2 to be released from engagement between the front fastening means 4b and the attachment socket 33 of the sub-frame 2. The rear portions 21 has further deformed directing the sub-frame in a direction towards the space underneath the passenger cell 50.

What is claimed is:

1. A sub-frame arrangement in a vehicle wherein said sub-frame arrangement comprises a sub-frame, a body member, and a first and second attachment socket, each attachment socket is adapted to host a fastening means adapted to fasten said sub-frame to the body member, wherein
    said fastening means are adapted to fasten a front section of said sub-frame,
    said first and second attachment sockets each comprises a weakened portion arranged at an angle separated from the travel direction of the vehicle, and
    the weakened portions are adapted to give way releasing the sub-frame in the event of deformation of the vehicle,
    characterized in that at least one of the weakened portions is arranged at an angle substantially perpendicular to the travel direction of the vehicle when viewed from above such that the at least one weakened portion is adapted to release the sub-frame when the body members deform in an outwards direction substantially perpendicular to the travel direction of the vehicle during a collision.

2. The sub-frame arrangement according to claim 1, wherein said fastening means are arranged in a through going aperture of each attachment socket.

3. The sub-frame arrangement according to claim 1, wherein the weakened portion of said first attachment socket is arranged at a different angle than the weakened portion of said second attachment socket.

4. The sub-frame arrangement according to claim 1, wherein said sub-frame is a dual part sub-frame comprising a lower sheet section and a top section.

5. The sub-frame arrangement according to claim 4, wherein said sub-frame further comprises two towers arranged as part of said top section.

6. The sub-frame arrangement according to claim 1, wherein said weakened portions are slits or other elongated weakened portions, extending in the longitudinal direction of each attachment socket.

7. The sub-frame arrangement according to claim 1, wherein the weakened portions of said attachment sockets are adapted to give way upon impact from an object of the drive line, power train, front suspension, or another object during deformation.

8. The sub-frame arrangement according to claim 1, wherein said weakened portion of the first attachment socket is arranged at a first angle (a) anti-clockwise seen from the front of the first attachment socket viewed from above and the weakened portion of the second attachment socket is arranged at an angle (b) seen from the front of the second attachment socket viewed from above.

9. The sub-frame arrangement according to claim 1, wherein the fastening means is adapted to be retained in the body member when the engagement to the sub-frame is released during deformation.

10. Method for releasing a sub-frame arrangement in a vehicle during deformation of said vehicle, wherein said sub-frame arrangement is the sub-frame arrangement according to claim 1, characterized in that method comprises the steps:
    retaining a front section of said sub-frame to the body member through said fastening means,
    releasing said sub-frame through deformation of the weakened portions of said attachment sockets during deformation of the vehicle and
    said weakened portion gives way when the body member deforms outwards in a direction substantially perpendicular to the travel direction of the vehicle.

11. The sub-frame arrangement according to claim 2, wherein the weakened portion of said first attachment socket is arranged at a different angle than the weakened portion of said second attachment socket.

12. The sub-frame arrangement according to claim 11, wherein said sub-frame is a dual part sub-frame comprising a lower sheet section and a top section.

13. The sub-frame arrangement according to claim 12, wherein said sub-frame further comprises two towers arranged as part of said top section.

14. The sub-frame arrangement according to claim 13, wherein said weakened portions are slits or other elongated weakened portions, extending in the longitudinal direction of each attachment socket.

15. The sub-frame arrangement according to claim 14, wherein the weakened portions of said attachment sockets are adapted to give way upon impact from an object of the drive line, power train, front suspension, or another object during deformation.

16. The sub-frame arrangement according to claim 15, wherein said weakened portion of the first attachment socket is arranged at a first angle (a) anti-clockwise seen from the front of the first attachment socket viewed from above and the weakened portion of the second attachment socket is arranged at an angle (b) seen from the front of the second attachment socket viewed from above.

17. The sub-frame arrangement according to claim 16, wherein the fastening means is adapted to be retained in the body member when the engagement to the sub-frame is released during deformation.

18. Method for releasing a sub-frame arrangement in a vehicle during deformation of said vehicle, wherein said sub-frame arrangement is the sub-frame arrangement according to claim 17, characterized in that method comprises the steps:
    retaining a front section of said sub-frame to the body member through said fastening means,
    releasing said sub-frame through deformation of the weakened portions of said attachment sockets during deformation of the vehicle and
    said weakened portion gives way when the body member deforms outwards in a direction substantially perpendicular to the travel direction of the vehicle.

19. A vehicle comprising a sub-frame arrangement wherein said sub-frame arrangement comprises a sub-frame, a body member, and a first and second attachment socket, each attachment socket is adapted to host a fastening means adapted to fasten said sub-frame to the body member, wherein
- said fastening means are adapted to fasten a front section of said sub-frame,
- said first and second attachment sockets each comprises a weakened portion arranged at an angle separated from the travel direction of the vehicle, and
- the weakened portions are adapted to give way releasing the sub-frame in the event of deformation of the vehicle,
- characterized in that at least one of the weakened portions is arranged at an angle substantially perpendicular to the travel direction of the vehicle when viewed from above such that the at least one weakened portion is adapted to release the sub-frame when the body members deform in an outwards direction substantially perpendicular to the travel direction of the vehicle during a collision.

* * * * *